United States Patent
Hotta et al.

(10) Patent No.: US 9,823,743 B2
(45) Date of Patent: Nov. 21, 2017

(54) DEVICES FOR ESTIMATING GAZE BASED ON A STATE OF AN EYELID OF A VIEWER

(71) Applicant: KABUSHIKI KAISHA TOSHIBA, Tokyo (JP)

(72) Inventors: Aira Hotta, Kanagawa (JP); Akihisa Moriya, Kanagawa (JP); Takashi Sasaki, Kanagawa (JP); Haruhiko Okumura, Kanagawa (JP); Masahiro Baba, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 87 days.

(21) Appl. No.: 14/607,430

(22) Filed: Jan. 28, 2015

(65) Prior Publication Data
US 2015/0212577 A1    Jul. 30, 2015

(30) Foreign Application Priority Data
Jan. 29, 2014  (JP) .................. 2014-014053

(51) Int. Cl.
   *G06F 3/01* (2006.01)
   *G06F 3/00* (2006.01)

(52) U.S. Cl.
   CPC .............. *G06F 3/013* (2013.01); *G06F 3/005* (2013.01)

(58) Field of Classification Search
   CPC . G06F 3/005; G06F 3/013; G06F 3/01; G06F 3/012; G09G 3/003
   See application file for complete search history.

(56) References Cited

U.S. PATENT DOCUMENTS

| 7,626,569 B2 * | 12/2009 | Lanier ................... G06F 1/1601 345/156 |
| 9,116,545 B1 * | 8/2015 | Raffle ..................... G06F 3/013 |
| 2006/0077558 A1 | 4/2006 | Urakawa et al. |
| 2008/0002262 A1 * | 1/2008 | Chirieleison ...... G02B 27/0093 359/630 |

(Continued)

FOREIGN PATENT DOCUMENTS

| JP | 11-95158 | 4/1999 |
| JP | 2004-133749 | 4/2004 |

(Continued)

OTHER PUBLICATIONS

Notification of Reason(s) for Refusal issued by the Japanese Patent Office dated Oct. 27, 2015, for Japanese Patent Application No. 2014-014053, and English-language translation thereof.

*Primary Examiner* — Md Saiful A Siddiqui
(74) *Attorney, Agent, or Firm* — Finnegan, Henderson, Farabow, Garrett & Dunner, L.L.P.

(57) ABSTRACT

According to one embodiment, a display device includes an imager and an image displayer. The imager images a first image of a first state of an eyelid of a viewer. The image displayer includes a light emitter and an optical unit. The light emitter emits light including image information. The optical unit includes a combiner. The light is incident on the optical unit. The combiner causes at least a portion of the light to be incident on an eyeball of the viewer. The image displayer modifies an incident direction of the portion of the light on the eyeball based on the first image imaged by the imager.

19 Claims, 8 Drawing Sheets

(56) References Cited

U.S. PATENT DOCUMENTS

| | | | |
|---|---|---|---|
| 2009/0115968 A1* | 5/2009 | Sugiyama | G02B 27/017 351/221 |
| 2013/0077049 A1* | 3/2013 | Bohn | G02B 5/20 351/210 |
| 2013/0106674 A1* | 5/2013 | Wheeler | G02B 27/017 345/8 |
| 2013/0207887 A1* | 8/2013 | Raffle | G02B 27/00 345/156 |
| 2013/0235169 A1 | 9/2013 | Kato et al. | |
| 2013/0257709 A1* | 10/2013 | Raffle | G06F 3/017 345/156 |

FOREIGN PATENT DOCUMENTS

| | | |
|---|---|---|
| JP | 2006-105889 | 4/2006 |
| JP | 2007-537610 | 12/2007 |
| JP | 2008-176096 | 7/2008 |
| WO | WO 2012/172719 | 12/2012 |

* cited by examiner

Dg=7°
SAD_UP=31
SAD_DOWN=37

FIG. 7A

Dg=15°
SAD_UP=39
SAD_DOWN=32

FIG. 7B

Dg=25°
SAD_UP=45
SAD_DOWN=25

FIG. 7C

Dg=35°
SAD_UP=51
SAD_DOWN=16

DEVICES FOR ESTIMATING GAZE BASED ON A STATE OF AN EYELID OF A VIEWER

CROSS-REFERENCE TO RELATED APPLICATIONS

This application is based upon and claims the benefit of priority from Japanese Patent Application No. 2014-014053, filed on Jan. 29, 2014; the entire contents of which are incorporated herein by reference.

FIELD

Embodiments described herein relate generally to a display device and a gaze estimating device.

BACKGROUND

For example, a head mounted display (HMD) mounted to the head of a user has been proposed. For example, in an external environment superimposed-type head mounted display, it is desirable for the display screen of the display to be easy to view regardless of whether the user is viewing a distal region or a proximal region. Such a display device and such a gaze estimating device that are easy to use are desirable.

DETAILED DESCRIPTION

According to one embodiment, a display device includes an imager and an image displayer. The imager images a first image of a first state of an eyelid of a viewer. The image displayer includes a light emitter and an optical unit. The light emitter emits light including image information. The optical unit includes a combiner. The light is incident on the optical unit. The combiner causes at least a portion of the light to be incident on an eyeball of the viewer. The image displayer modifies an incident direction of the portion of the light on the eyeball based on the first image imaged by the imager.

According to one embodiment, a gaze estimating device includes an imager and a processor. The imager images a first image of a first state of an eyelid of a viewer. The processor estimates a direction of a gaze of the viewer in the first state based on the first image.

Various embodiments will be described hereinafter with reference to the accompanying drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing thereinabove are marked with like reference numerals, and a detailed description is omitted as appropriate.

Figure 1:
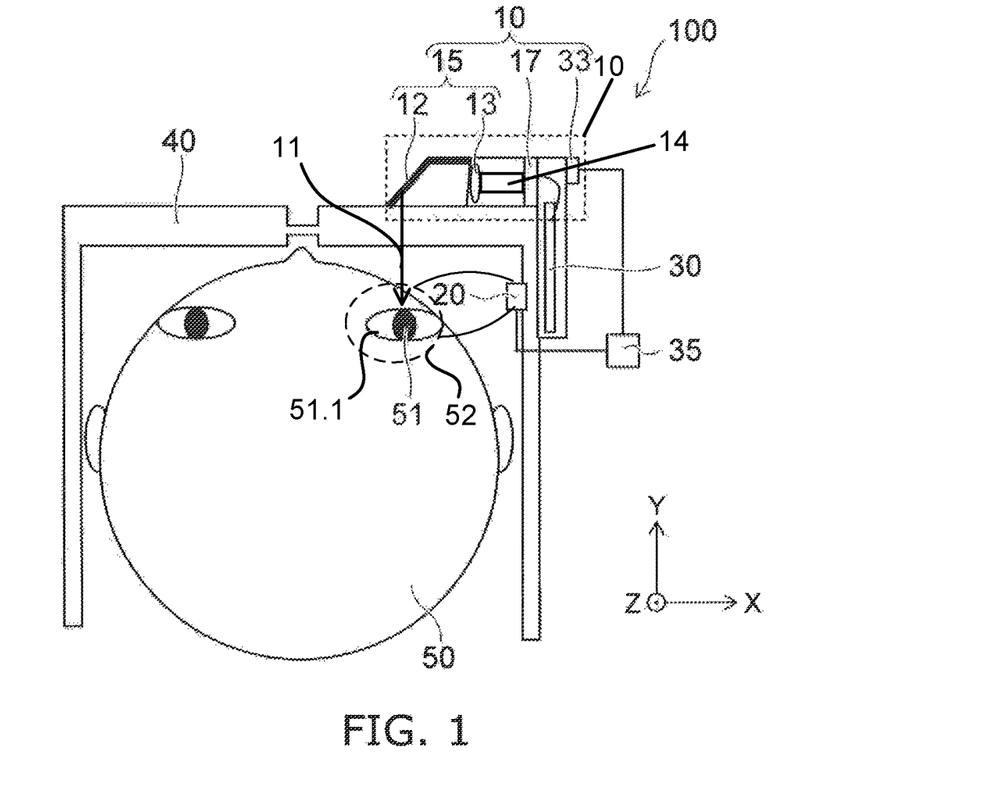
FIG. 1 is a schematic view illustrating a display device according to an embodiment.

FIG. 1 is a schematic view illustrating a display device according to an embodiment.

As shown in FIG. 1, the display device 100 according to the embodiment includes an image displayer 10 and an imager 20.

The image displayer 10 includes an optical unit 15 and a light emitter 17. The light emitter 17 emits light including image information 10. At least a portion of the light including the image information is incident on the optical unit 15. The optical unit 15 causes at least a portion of the light including the image information that is incident to travel toward (be incident on) an eye 51 of a viewer 50. Thereby, the viewer 50 perceives the image. The display device 100 is, for example, a head mounted display (HMD) mounted to the head of the user (the viewer).

In the example, the display device 100 further includes a holder 40. The holder 40 holds, for example, the image displayer 10 and the imager 20. The holder 40 regulates, for example, the spatial arrangement between the image displayer 10 and the eye 51 of the viewer 50. The holder 40 regulates, for example, the spatial arrangement between the image displayer 10 and the imager 20. The configuration of the holder 40 is, for example, a configuration such as the frame of eyeglasses.

The light emitter 17 (the display panel) includes, for example, a see-though liquid crystal display (LCD) panel. The light emitter 17 may include an organic EL panel, a LCOS (Liquid Crystal On Silicon) panel, a DMD (Digital Micromirror Device) panel, etc. The light emitter 17 may include a laser light source. In such a case, the laser light source displays images by raster scanning.

In the example, the display device 100 further includes a drive circuit 30. The drive circuit 30 is electrically connected to the light emitter 17 and controls the operation of the light emitter 17. The drive circuit 30 may be provided with the image displayer 10 as a single body.

The optical unit 15 includes, for example, an ocular lens 13 and a combiner 12. The ocular lens 13 is provided between the light emitter 17 and the eye 51 in the optical path of the light including the image information emitted by the light emitter 17. The combiner 12 is provided between the ocular lens 13 and the eye 51 in the optical path of the light including the image information.

In the example, the direction from the eye 51 toward the combiner 12 is taken as, for example, a Y-axis direction. One direction perpendicular to the Y-axis direction is taken as an X-axis direction. A direction perpendicular to the X-axis direction and perpendicular to the Y-axis direction is taken as a Z-axis direction. For example, the X-axis direction is the right direction from the viewer 50. For example, the Y-axis direction is the frontward direction from the viewer 50. For example, the Z-axis direction is the upward direction from the viewer 50.

For example, at least a portion of the light including the image information is condensed by the ocular lens 13 and is incident on the combiner 12. The combiner 12 causes at least a portion of the light that is incident to be incident on the eye 51 (the eyeball). Thereby, for example, the image that is displayed by the light emitter 17 is displayed to the viewer 50 as a virtual image.

The combiner 12 includes, for example, a half mirror. The light including the image information is reflected by the half mirror and travels toward the eye 51. By using the half mirror, for example, the viewer 50 can simultaneously view the external light and the image.

The combiner 12 transmits at least a portion of the external light traveling toward the eye 51 from the side of the combiner 12 opposite to the eye 51. Thereby, the viewer 50 can simultaneously view the external light and the image.

The half mirror is made by, for example, vapor deposition of aluminum on a glass plate or a transparent plastic plate. The half mirror may include a dielectric multilayer film provided on the glass plate or the transparent plastic plate.

The combiner 12 and the eyeglasses lens may be a single body. In other words, the lens surface of the eyeglasses (the holder 40) may be light-reflective; and the light including the image information may be incident on the lens surface.

For example, the imager 20 images the eye 51 of the viewer 50, The imager 20 images a first image 52 of a first state of an eyelid 51.1 of the viewer 50. The imager 20 includes, for example, a camera. For example, the imager 20 is mounted to the holder 40 and disposed to be able to image the entire eye 51 of the viewer 50. In the example, the imager 20 is disposed at the side of the viewer 50. As described below, the imager 20 may be disposed at the front of the viewer 50.

The direction of the gaze of the viewer 50 is sensed (estimated) based on the image (the first image) of the eyelid imaged by the imager 20. Based on the direction of the gaze that is sensed, the image displayer 10 modifies the incident direction 11 on the eye 51 (the eyeball) of at least a portion of the light including the image information that is incident on the eye 51 (the eyeball). In other words, the image displayer 10 modifies the display position of the image with respect to the position of the eye 51. The direction of the gaze of the viewer 50 is sensed based on the image of the eyelid. The image that is displayed is controlled based on the direction of the gaze that is sensed. Thereby, the image can be displayed at a position that is easy to view by the viewer 50.

Figure 2:
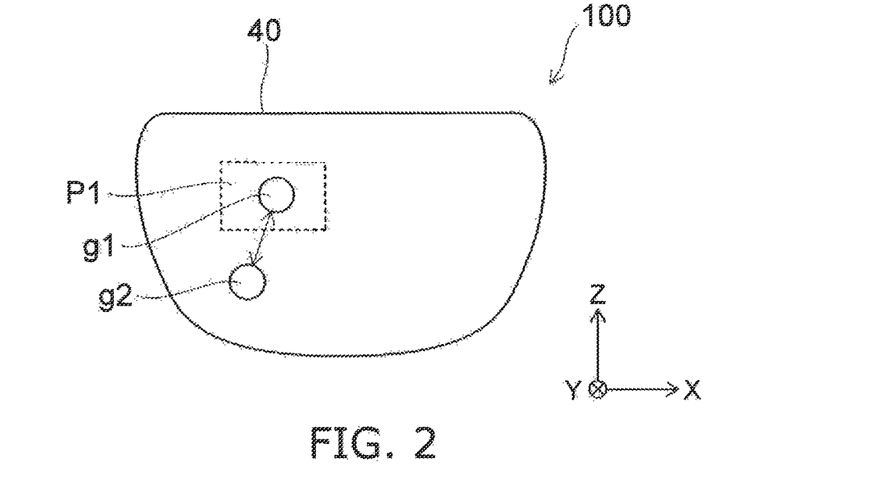
FIG. 2 is a schematic view illustrating an operation of the display device.

FIG. 2 is a schematic view illustrating an operation of the display device.

FIG. 2 shows the visual field of the viewer 50 using the display device 100. For example, when the viewer 50 views a distal region, the fixation point of the viewer 50 is proximal to a point g1. At this time, for example, the display device 100 displays an image P1 to match the position of the point g1.

For example, the gaze of a human moves upward when viewing a distal region and moves downward when viewing a proximal region. When the viewer 50 views the proximal region, the fixation point of the viewer 50 is, for example, proximal to a point g2. For example, the angle between the direction of the gaze of the viewer 50 when the viewer 50 views the distal region at the front and the direction of the gaze of the viewer 50 when the viewer 50 views the proximal region (e.g., the vicinity of the hands) is about 30 degrees (°) to 40°.

For example, such a change of the gaze is applied to bifocal eyeglasses. In a lens of bifocal eyeglasses, the optical characteristic (the optical power) of the portion corresponding to the gaze direction when viewing the distal region is different from the optical characteristic (the optical power) of the portion corresponding to the gaze direction when viewing the proximal region.

For example, there are cases where the area where the image is displayed is set to be wide in a head mounted display of a reference example. For example, the angle (the angle of view in the vertical direction) between the direction of the gaze toward the upper end of the display area and the direction of the gaze toward the lower end of the display area is about 30° to 40°. Thereby, the display can be used for both the direction of the gaze when viewing a distal region and the direction of the gaze when viewing a proximal region.

However, in the case where the angle of view is increased, the size of the optical unit 15 easily becomes large. For example, there is a correlation between the angle of view and the size of the optical unit 15. There are cases where the angle of view cannot be large when making the head mounted display lightweight and compact.

Conversely, in the display device according to the embodiment, the gaze of the viewer is sensed; and the position of the image that is displayed is modified according to the gaze that is sensed. Thereby, the increase of the size of the optical unit 15 is suppressed; and the device can be used for both the gaze direction when viewing the distal region and the gaze direction when viewing the proximal region.

Figure 3A:
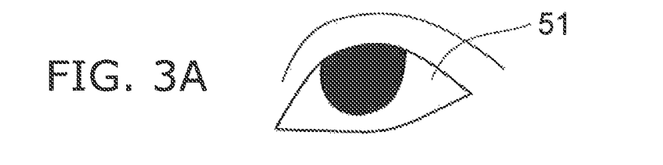
FIG. 3A and FIG. 3B are schematic views illustrating an operation of the display device according to the embodiment.
Figure 3B:
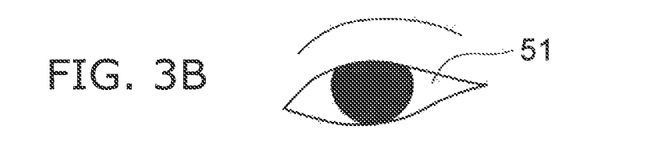

FIG. 3A and FIG. 3B are schematic views illustrating an operation of the display device according to the embodiment. FIG. 3A and FIG. 3B are schematic views showing images of the eye 51 imaged by the imager 20.

FIG. 3A shows the image of the eye 51 when the viewer 50 views a distal region at the front (in the horizontal direction). FIG. 3B shows the image of the eye 51 when the viewer 50 views a proximal region (a direction about 30° downward from the direction of the gaze when viewing the distal region).

As shown in FIG. 3A and FIG. 3B, the shape of the eye is different according to the direction of the gaze. The shape of the eyelid (the degree of opening of the eye) when viewing the distal region is different from the shape of the eyelid when viewing the proximal region. In the display device 100, for example, the gaze direction of the viewer 50 is sensed using the difference between the shapes.

Figure 4:
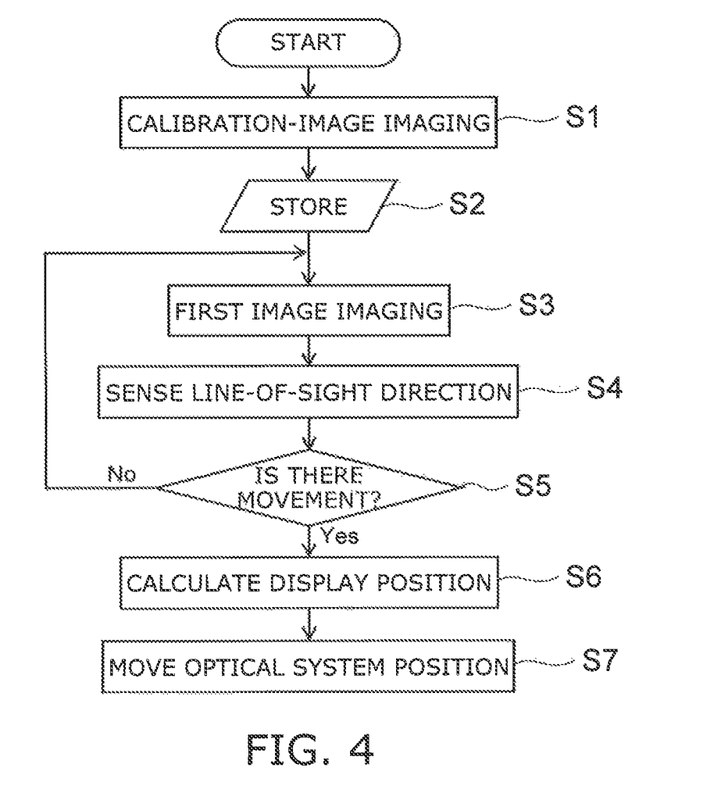
FIG. 4 is a schematic view illustrating operations of the display device according to the embodiment.

FIG. 4 is a schematic view illustrating operations of the display device according to the embodiment.

FIG. 4 is a flowchart of the operations of the display device 100. As shown in FIG. 4, the operations of the display device 100 include, for example, a calibration-image imaging step (step S1), an image save step (step S2), a first image imaging step (step S3), a gaze direction sensing step (step S4), a gaze direction determination step (step S5), a display position calculation step (step S6), and an optical system position movement step (step S7).

For example, in step S1, the image (a second image) of the eye 51 in the state (a second state) of viewing the distal region is imaged by the imager 20. For example, the second image is an image of the eyelid in the state in which the gaze of the viewer 50 is oriented toward the front of the viewer 50.

Also, in step S1, the image (a third image) of the eye 51 in the state (a third state) of viewing the proximal region is imaged by the imager 20. For example, the third image is an image of the eyelid in the state in which the gaze of the viewer 50 is oriented downward from the viewer 50.

For example, in step S2, the second image and the third image are retained (stored) as reference images (calibration images).

The direction of the gaze of the viewer 50 in the second state is different from the direction of the gaze of the viewer 50 in the third state. For example, the gaze of the viewer 50 in the third state is oriented downward. The gaze of the viewer 50 in the second state is oriented upward from the gaze of the viewer 50 in the third state.

For example, step S1 and step S2 are performed each time the operation of the display device 100 is started. For example, if data (images) are already imaged and retained, the data may be read. Thus, when starting the operation of the display device 100, step S1 and step S2 may not be performed each time.

For example, the user (the viewer 50), the calibration image that is imaged, and the correspondence between the user (the viewer 50) and the calibration image are retained. Thereby, for example, user authentication can be performed and the calibration image can be read when using the display device. The user authentication may include any method such as authentication by an ID, face recognition, iris recognition, etc. It is favorable for the person of the calibration image and the person of the first image to be the same person. Thereby, the sensing precision of the gaze direction increases. The person of the calibration image and the person of the first image may not always be the same person.

For example, in step S3, the imager 20 sequentially images the image (the first image) of the eye 51 (the eyelid) of the viewer 50.

In step S4, the direction of the gaze of the viewer 50 is sensed. The direction of the gaze is sensed by a comparison of the first image and the pre-imaged second image and a comparison of the first image and the pre-imaged third image.

For example, the direction of the gaze is sensed for each of the first images that are sequentially imaged. For example, in step S5, movement of the direction of the sensed gaze is determined. For example, in the case where there is no large change in the direction of the sensed gaze, the display device 100 repeats steps S3 to S5. In the case where there is a large change in the direction of the sensed gaze, the display device 100 performs, for example, step S6 and step S7.

In step S6, the position of the image that the display device 100 displays is calculated based on the direction of the gaze that is sensed. The display position of the image with respect to the position of the eye 51 is calculated.

In step S7, the image displayer 10 modifies the display position based on the display position that is calculated. Thereby, the image is displayed at a position corresponding to the direction of the gaze of the viewer 50. The image can be displayed at an easily-viewable position regardless of the direction of the gaze of the viewer 50. After performing step S7, the display device 100 performs steps S3 to S5. Step S6 and step S7 are performed according to the direction of the gaze. The display device 100 ends the operation by following an end instruction from the user or an end instruction from another device connected to the display device 100.

Figure 5:
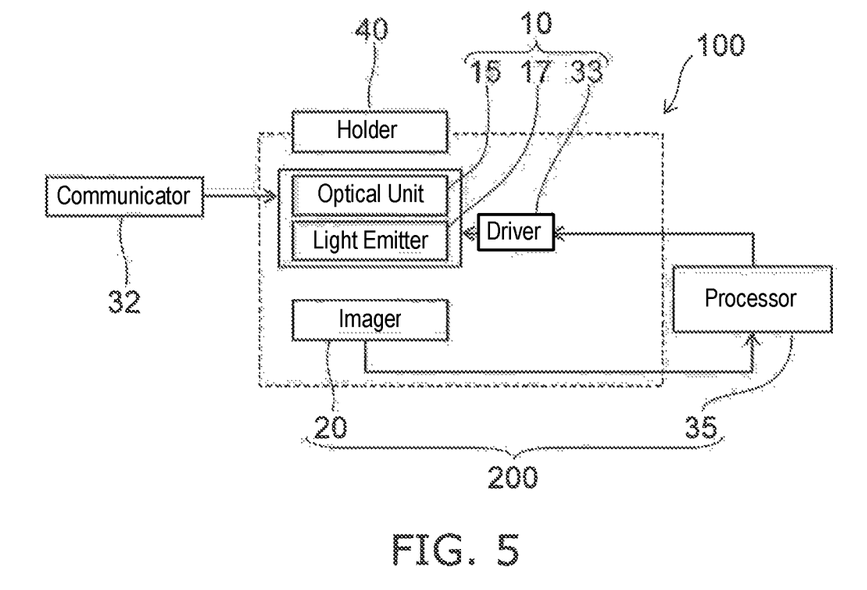
FIG. 5 is a block diagram illustrating the display device according to the embodiment.

FIG. 5 is a block diagram illustrating the display device according to the embodiment.

FIG. 5 shows an image display system using the display device 100.

As shown in FIG. 5, the display device 100 includes the image displayer 10 and the imager 20. The image displayer 10 includes, for example, the light emitter 17 and the optical unit 15. In the example, the image displayer 10 further includes a driver 33 (the display position control mechanism).

For example, the display device 100 may include a communicator 32. The image information is supplied from the communicator 32 to the image displayer 10. For example, the image information is supplied from the communicator 32 via the drive circuit 30. Thereby, the image displayer 10 displays the image to the viewer. The communicator 32 may not be included in the display device 100. The communicator 32 may be provided with the display device 100 as a single body or may be provided separately from the display device 100.

For example, the display device 100 further includes a processor 35. For example, the display device 100 includes a gaze estimating device 200 that includes the imager 20 and the processor 35. The holder 40 may be considered to be included in the gaze estimating device 200. The first to third images are imaged by the imager 20. The first to third images that are imaged are transmitted to, for example, the processor 35. For example, the processor 35 senses (estimates) the direction of the gaze of the viewer 50 based on the first to third images. The processor 35 calculates the position of the image to be displayed by the display device 100 based on the direction of the gaze that is sensed. The processor 35 may not be included in the display device 100. The processor 35 may be provided with the display device 100 as a single body or may be provided separately from the display device 100.

For example, an IC, etc., for performing the processing recited above is provided with the display device 100 as a single body in the case where the processor 35 is included in the display device 100. The hardware configuration of the processor 35, etc., shown in FIG. 5 is an example; and a portion of or the entire gaze estimating device 200 (the display device 100) according to the embodiment may be realized as an integrated circuit having LSI (Large Scale Integration), etc., or an IC (Integrated Circuit) chipset. Each functional block may be provided with a processing feature individually; or some or all of each functional block may be provided with a processing feature by integration. Also, the method for adapting to an integrated circuit is not limited to LSI and may be realized using a dedicated circuit or a general-purpose processor.

The processor 35 may be, for example, a portable terminal, a PC, etc. For example, the processor 35 includes a CPU (Central Processing Unit), ROM (Read Only Memory), and RAM (Random Access Memory). For example, the processing of the processor 35 is performed by the CPU reading a program stored in memory such as ROM, etc., into RAM and executing the program. In such a case, for example, the processor 35 is not included in the display device 100 and is provided separately from the display device 100. For example, communication between the display device 100 and the processor 35 is performed by a wired or wireless method. The communication between the display device 100 and the processor 35 may include, for example, a network such as cloud computing. The embodiment may be a display system including the image displayer 10, the imager 20, the processor 35, etc. A portion of the processing to be implemented by the processor 35 may be realized by a circuit; and the remaining processing may be realized using a calculating device (a computer, etc.) in a cloud connected via a network.

For example, the information of the display position of the image that is calculated by the processor 35 is transmitted to the image displayer 10 or the driver 33. For example, the driver 33 can modify the position of the optical unit 15 with respect to the eye 51. For example, the driver 33 modifies the position of at least a portion of the image displayer 10 with respect to the eye 51 based on the first image.

For example, the display position of the image with respect to the eye 51 is modified by the operation of at least one of the light emitter 17, the optical unit 15, or the driver 33. The modification of the display position of the image is described below.

The driver 33 may be provided separately from the image displayer 10. The driver 33 may be provided with the image displayer 10 as a single body or may be provided separately.

Figure 6A:
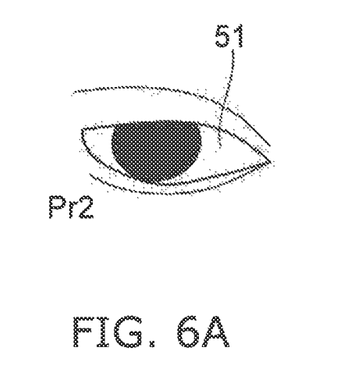
FIG. 6A and FIG. 6B are schematic views illustrating an operation of the display device according to the embodiment.
Figure 6B:
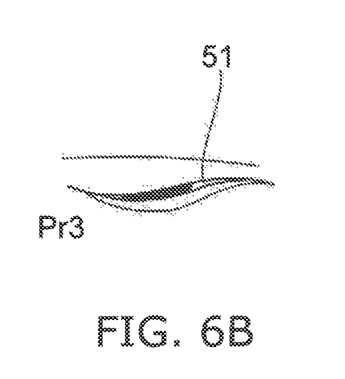

FIG. 6A and FIG. 6B are schematic views illustrating an operation of the display device according to the embodiment.

FIG. 6A shows an image Pr2 (the second image) of the eye 51 in the state in which the viewer 50 views the frontward direction (the horizontal direction). FIG. 6B shows an image Pr3 (the third image) of the eye 51 in the state in which the viewer 50 views downward 30° from the frontward direction. The image of FIG. 6A and the image of FIG. 6B are, for example, images that are imaged by the imager 20.

For example, the direction of the gaze when the viewer 50 views the distal region (the frontward direction or the horizontal direction) is taken as the 0° direction. A gaze direction Dg of the viewer 50 is, for example, the angle between the 0° direction (the horizontal direction) and the gaze direction. A direction downward from the horizontal direction is taken to be the positive direction of the angle. For example, the gaze direction Dg of the image shown in FIG. 6A is the 0° direction. The gaze direction Dg of the image shown in FIG. 6B is the 30° direction.

FIG. 7A to FIG. 7D are schematic views illustrating operations of the display device according to the embodiment.

FIG. 7A to FIG. 7D show the image (the first image) of the eye 51 imaged by the imager 20.

Figure 7A:
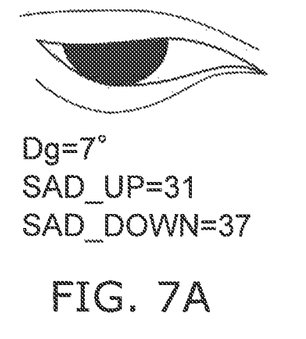
FIG. 7A to FIG. 7D are schematic views illustrating operations of the display device according to the embodiment.
Figure 7B:
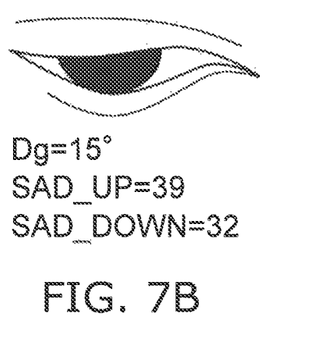
Figure 7C:
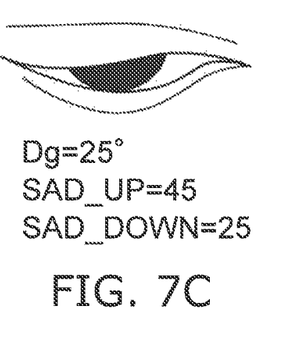
Figure 7D:
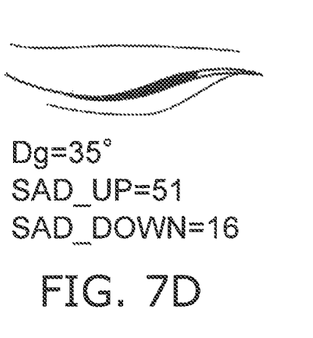

FIG. 7A is an image of the eye 51 in the state in which the gaze direction Dg is the 7° direction. FIG. 7B is an image of the eye 51 in the state in which the gaze direction Dg is the 15° direction. FIG. 7C is an image of the eye 51 in the state in which the gaze direction Dg is the 25° direction. FIG. 7D is an image of the eye 51 in the state in which the gaze direction Dg is the 35° direction.

For example, the images shown in FIG. 6A and FIG. 6B are used as reference images. The gaze of the viewer 50 in the images (the test images) shown in FIG. 7A to FIG. 7D can be sensed using the reference images. For example, the absolute error (e.g., SAD (Sum of Absolute Differences)) between the test images and the reference images is calculated. In other words, the difference SAD between the second image and the first image and the difference SAD between the third image and the first image are calculated. For example, it is determined that two images become similar as the value of the difference SAD decreases and the two images become different as the value of the difference SAD increases.

Figure 8:
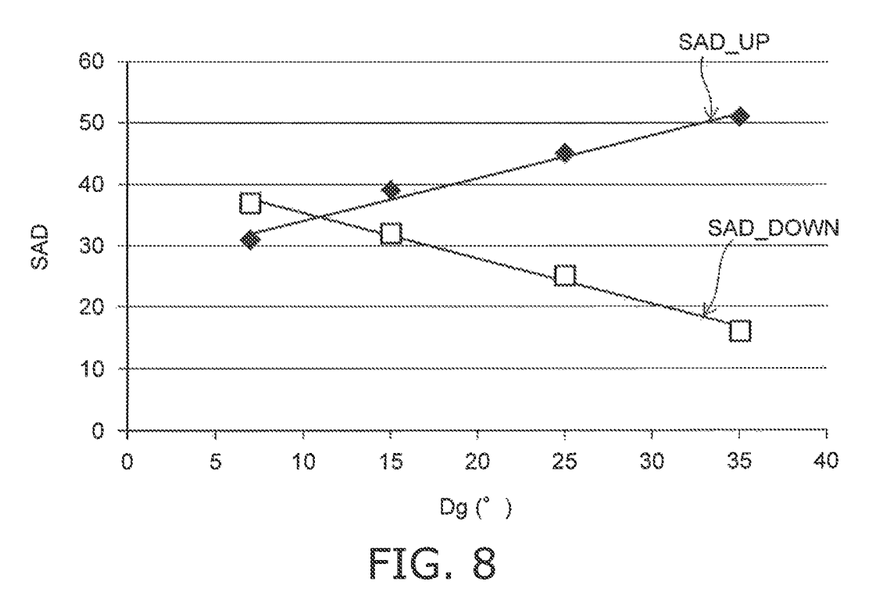
FIG. 8 is a graph of operations of the display device according to the embodiment.

FIG. 8 is a graph of operations of the display device according to the embodiment.

FIG. 8 shows the difference SAD between the reference images and the test images. The vertical axis of FIG. 8 is the difference SAD. The horizontal axis of FIG. 8 is the gaze direction Dg (°).

The difference SAD between the reference image and the test image is a difference SADUP when the image shown in FIG. 6A is used as the reference image and when the images shown in each of FIG. 7A to FIG. 7D are used as the test images. In other words, the difference SADUP is the difference SAD between the first image and the second image.

The difference SAD between the reference image and the test image is a difference SADDOWN when the image shown in FIG. 66 is used as the reference image and when the images shown in each of FIG. 7A to FIG. 7D are used as the test images. In other words, the difference SADDOWN is the difference SAD between the first image and the third image.

For example, as shown in FIG. 8, the gaze direction Dg and the difference SAD change linearly. The gaze direction Dg can be estimated for the test images by calculating the difference SAD between the reference image and the test image.

Although the similarity between the images is determined using the absolute error (SAD) between the images in the example, other methods may be used. For example, the squared error (the SSD (Sum of Squared Differences)) between the images may be used.

Figure 9A:
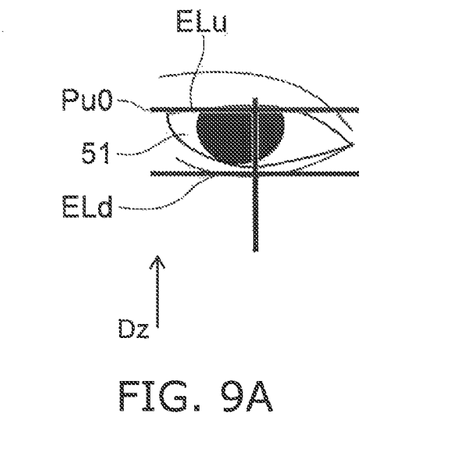
FIG. 9A and FIG. 9B are schematic views illustrating operations of the display device according to the embodiment.
Figure 9B:
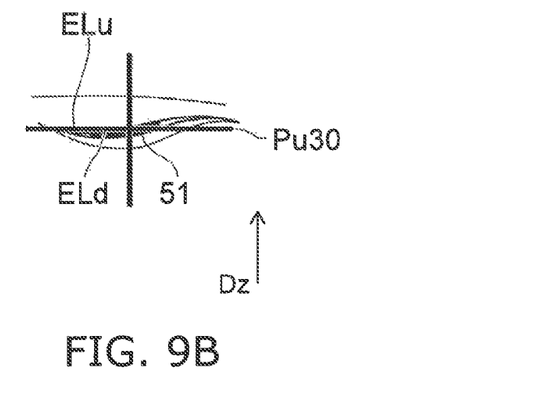

FIG. 9A and FIG. 9B are schematic views illustrating operations of the display device according to the embodiment.

For example, the gaze direction Dg can be sensed using the position of the eyelid.

FIG. 9A shows an image (the second image) of the eye 51 in the state in which the gaze direction Dg is the 0° direction. FIG. 9B shows an image of the eye 51 in the state in which the gaze direction Dg is the 30° direction. The image of FIG. 9A and the image of FIG. 9B are, for example, images imaged by the imager 20.

As shown in FIG. 9A, for example, the position of the eyelid is up when the viewer 50 views in the horizontal direction. As shown in FIG. 9B, for example, the position of the eyelid is down when the viewer 50 views downward.

For example, the direction from a lower eyelid ELd toward an upper eyelid ELu in the image is taken as a Dz direction (a+Dz direction). The direction from the upper eyelid ELu toward the lower eyelid ELd is taken as a −Dz direction. A position Pu0 in the Dz direction of the upper eyelid ELu in the image of FIG. 9A is positioned in the +Dz direction as viewed from a position Pu30 in the Dz direction of the upper eyelid ELu in the image of FIG. 9B. In other words, the upper eyelid ELu of FIG. 9A is higher in the image than the upper eyelid ELu of FIG. 9B.

For example, a position PLz of the upper eyelid ELu is sensed in the image (the first image) of the eye 51. The position PLz of the upper eyelid ELu in the first image and the position Pu0 of the upper eyelid ELu in the second image are compared. The position PLz of the upper eyelid ELu in the first image and the position Pu30 of the upper eyelid ELu in the third Image are compared. Thereby, the direction of the gaze of the viewer 50 can be estimated when the first image is imaged.

FIG. 10A to FIG. 10D are schematic views illustrating operations of the display device according to the embodiment.

FIG. 10A to FIG. 10D show the image (the first image) of the eye 51 imaged by the imager 20.

Figure 10A:
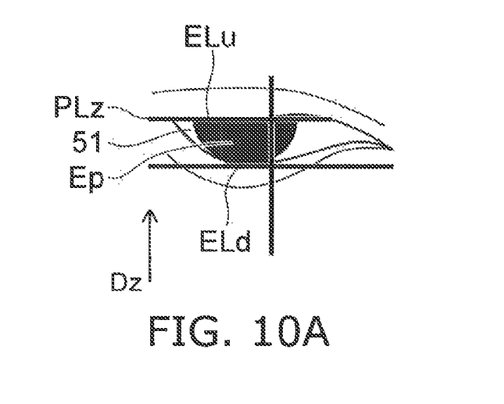
FIG. 10A to FIG. 10D are schematic views illustrating operations of the display device according to the embodiment.
Figure 10B:
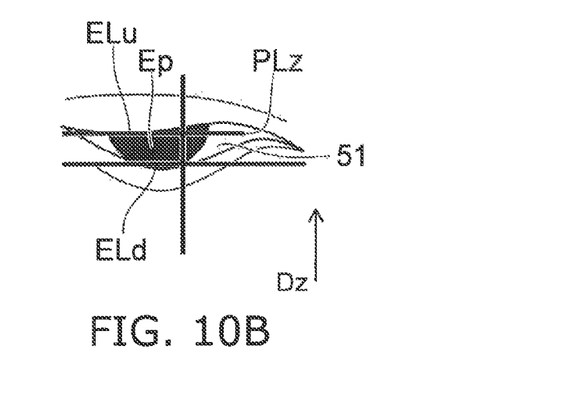
Figure 10C:
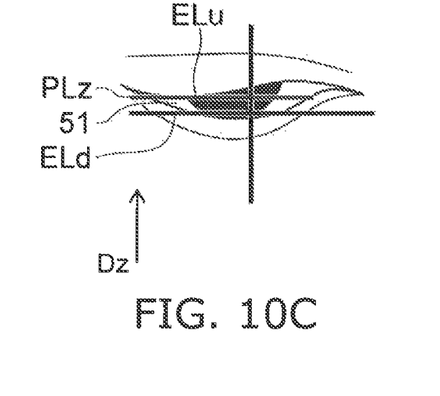
Figure 10D:
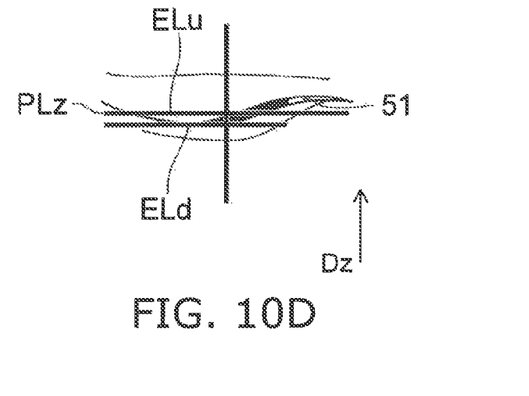

FIG. 10A is an image of the eye 51 in the state in which the gaze direction Dg is the 7° direction. FIG. 10B is an image of the eye 51 in the state in which the gaze direction Dg is the 15° direction. FIG. 10C is an image of the eye 51 in the state in which the gaze direction Dg is the 25° direction. FIG. 10D is an image of the eye 51 in the state in which the gaze direction Dg is the 35° direction.

In each of the images shown in FIG. 10A to FIG. 10D, the position PLz in the Dz direction of the upper eyelid ELu is sensed. Specifically, for example, the boundary between the upper eyelid ELu and a pupil Ep of the viewer 50 is sensed. The position PLz in the Dz direction of the upper eyelid ELu that is sensed is compared to the position Pu0 and the position Pu30. Thereby, the gaze direction can be sensed for each of the images shown in FIG. 10A to FIG. 10D.

Figure 11A:
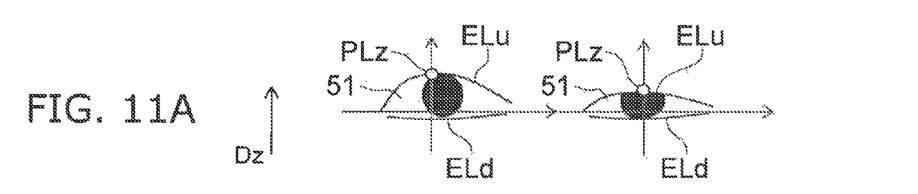
FIG. 11A to FIG. 11C are schematic views illustrating operations of the display device according to the embodiment.
Figure 11B:
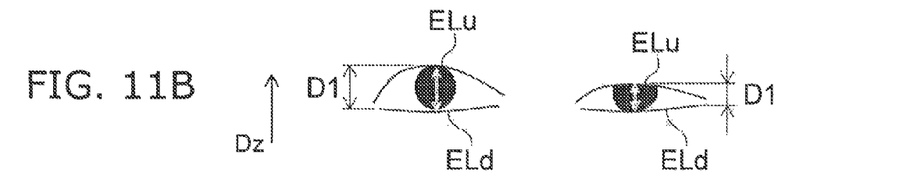
Figure 11C:
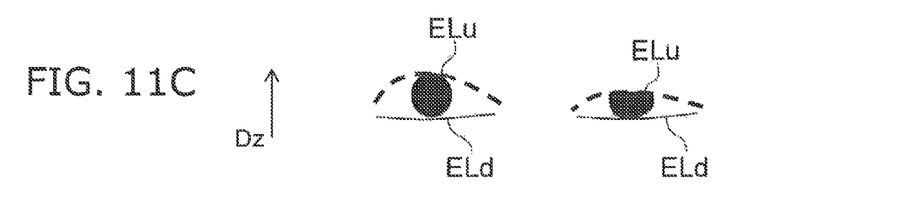

FIG. 11A to FIG. 11C are schematic views illustrating operations of the display device according to the embodiment.

FIG. 11A to FIG. 11C show the sensing of the gaze direction in the display device 100.

As shown in FIG. 11A, for example, the position PLz of the image of the upper eyelid ELu in the Dz direction is sensed. Thereby, the gaze direction can be sensed.

As shown in FIG. 11B, a distance D1 between the upper eyelid ELu and the lower eyelid EU may be sensed; and the direction of the gaze may be sensed based on the distance D1.

As shown in FIG. 11C, the shape (e.g., the curvature) of the eyelid (e.g., the upper eyelid ELu) may be sensed; and the direction of the gaze may be sensed based on the shape.

For example, the image displayer 10 modifies the display position of the image with respect to the position of the eye 51 based on the direction of the gaze sensed by any of the methods shown in FIG. 11A to FIG. 11C.

FIG. 12A to FIG. 12C, FIG. 13A to FIG. 13C, FIG. 14A to FIG. 14C, and FIG. 15A to FIG. 15C are schematic views illustrating operations of the display device according to the embodiment.

In the example, the holder 40 has a configuration similar to an eyeglasses frame.

Figure 12A:
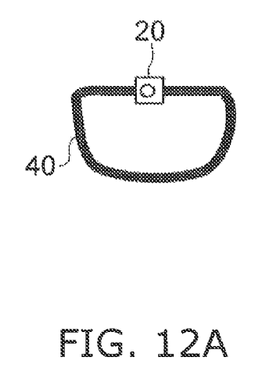
FIG. 12A to FIG. 12C are schematic views illustrating operations of the display device according to the embodiment.
Figure 12B:
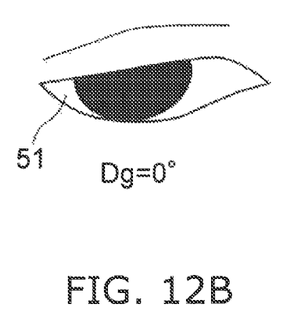
Figure 12C:
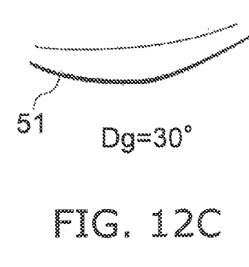

As shown in FIG. 12A, the imager 20 may be provided at the upper side of the holder 40. In such a case, the imager 20 images the eye 51 from the upper side of the eye 51. FIG. 12b and FIG. 12C show images of the eye 51 imaged in the state of FIG. 12A. FIG. 12b is an image of the eye 51 in the state in which the gaze direction Dg is the 0° direction; and FIG. 12C is an image of the eye 51 in the state in which the gaze direction Dg is the 30° direction.

Figure 13A:
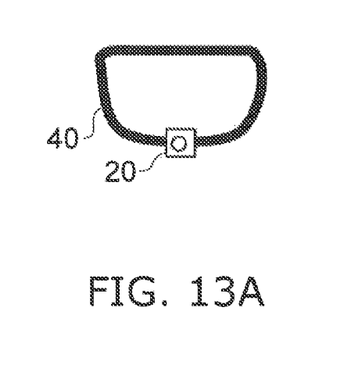
FIG. 13A to FIG. 13C are schematic views illustrating operations of the display device according to the embodiment.
Figure 13B:
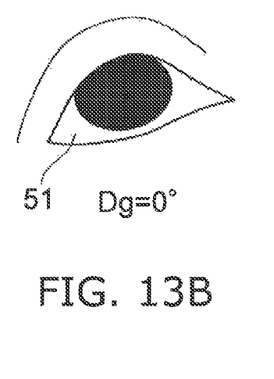
Figure 13C:
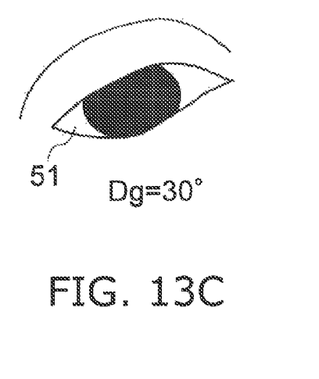

As shown in FIG. 13A, the imager 20 may be provided at the lower side of the holder 40. In such a case, the imager 20 images the eye 51 from the lower side of the eye 51. FIG. 13B and FIG. 13C show images of the eye 51 when imaged in the state of FIG. 13A. FIG. 13b is an image of the eye 51 in the state in which the gaze direction Dg is the 0° direction; and FIG. 13C is an image of the eye 51 in the state in which the gaze direction Dg is the 30° direction.

In the case where the imager 20 is provided at the upper side and lower side of the holder 40, the direction of the gaze can be sensed by sensing the shape of the eye, the position PLz of the upper eyelid, the distance D1 between the upper eyelid and the lower eyelid, or the shape (the curvature) of the upper eyelid.

Figure 14A:
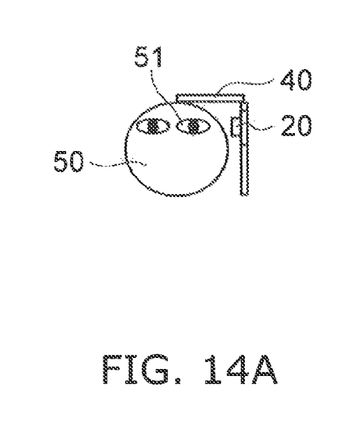
FIG. 14A to FIG. 14C are schematic views illustrating operations of the display device according to the embodiment.
Figure 14B:
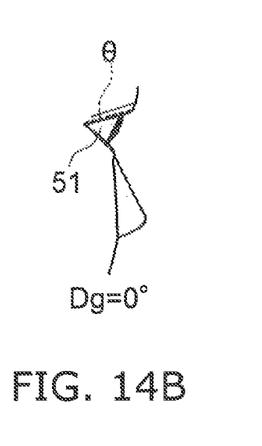
Figure 14C:
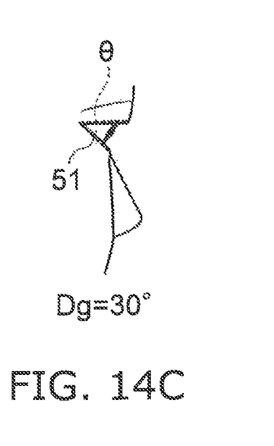

As shown in FIG. 14A, the imager 20 may be provided at the side portion of the holder 40. In such a case, the imager 20 images the eye 51 from the side of the viewer 50. FIG. 14B and FIG. 14C show images of the eye 51 imaged in the state of FIG. 14A. FIG. 146 is an image of the eye 51 in the state in which the gaze direction Dg is the 0° direction; and FIG. 14C is an image of the eye 51 in the state in which the gaze direction Dg is the 30° direction. In such a case, for example, the direction of the gaze can be sensed by sensing the shape of the eye, the distance D1 between the upper eyelid and the lower eyelid, or an angle θ between the upper eyelid and the lower eyelid.

Figure 15A:
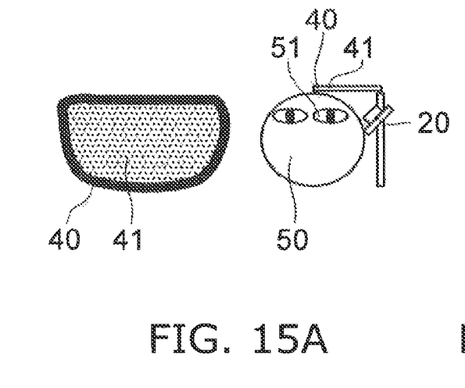
FIG. 15A to FIG. 15C are schematic views illustrating operations of the display device according to the embodiment.
Figures 15B, 15C:
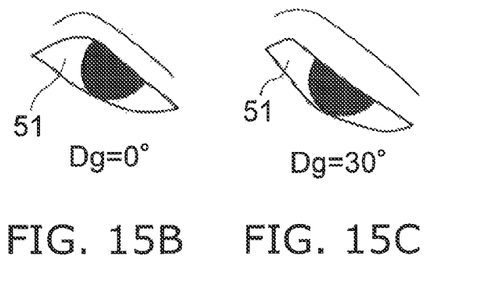

As shown in FIG. 15A, for example, a reflector 41 is provided on the holder 40. The imager 20 may image the image of the eye 51 appearing at the reflector 41. For example, the reflector 41 is provided at a portion corresponding to the lens of the eyeglasses. The reflector 41 is, for example, light-reflective. The reflector 41 includes, for example, a half mirror. FIG. 15B and FIG. 15C show images of the eye 51 imaged in the state of FIG. 15A. FIG. 15B is an image of the eye 51 in the state in which the gaze direction Dg is the 0° direction; and FIG. 15C is an image of the eye 51 in the state in which the gaze direction Dg is the gaze direction Dg. In such a case, for example, the direction of the gaze can be sensed by sensing the shape of the eye, the position PLz of the upper eyelid, or the distance D1 between the upper eyelid and the lower eyelid. For example, infrared light is irradiated on the eye 51; and an infrared camera is used as the imager 20. Thereby, for example, the image of the eye 51 appearing at the reflector 41 can be imaged with higher certainty.

For example, there is a display device of a reference example in which, for the image of the eye 51 of the viewer 50, the direction of the gaze is sensed based on an image of the pupil instead of the eyelid. In the display device of the reference example as well, for example, an imager is provided. The image of the pupil of the viewer is multiply acquired by the imager; and the direction of the gaze is sensed based on the images. However, in the method of such a reference example, it is necessary to reliably image the pupil. Therefore, for example, the position of the imager that images the eye is limited to a position where the pupil can be imaged. There are cases where it is necessary to move the imager to image the pupil.

Conversely, in the display device according to the embodiment, the gaze direction of the viewer 50 is sensed based on the image of the eyelid of the eye 51. Thereby, as described above, the degrees of freedom of the disposition of the imager 20 are high. For example, compared to the display device of the reference example, the gaze direction can be sensed with high precision. The gaze direction is easy to sense. Thereby, the image can be displayed at a more appropriate position.

Figure 16A:
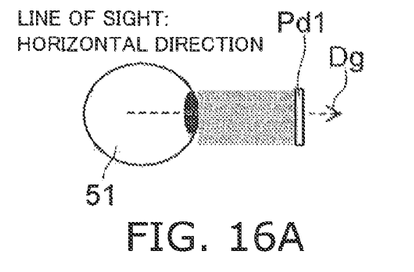
FIG. 16A to FIG. 16C are schematic views illustrating operations of the display device.
Figure 16B:
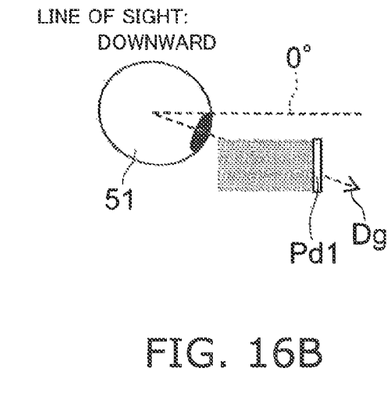
Figure 16C:
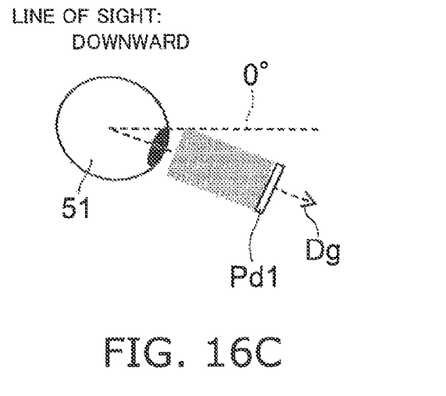

FIG. 16A to FIG. 16C are schematic views illustrating operations of the display device.

The image displayer 10 modifies the display position of the image with respect to the position of the eye 51 based on the direction of the gaze that is sensed. For example, the display position of the image is modified by the driver 33. For example, the driver 33 rotates at least a portion (e.g., the optical unit 15 and the light emitter 17) of the image displayer 10. The central axis of the rotation corresponds to, for example, the position of the eye 51. Thereby, the display position of the image and the gaze direction of the viewer 50 are adjusted.

FIG. 16A to FIG. 16C show the relationship between the display position and the gaze direction of the image. FIG. 16A shows the state in which the gaze direction of the viewer 50 is the 0° direction. As shown in FIG. 16A, a screen Pd1 (the display surface of the image perceived by the viewer 50) is, for example, perpendicular to the gaze direction Dg. In other words, for example, the light including the image information travels in a direction parallel to the gaze direction Dg and is incident on the eye 51. In such a case, if the screen Pd1 is inside the visual field of the viewer 50 (if the eye 51 of the viewer 50 is inside the eye range of the image), the viewer 50 can view the entire image.

FIG. 16B and FIG. 16C show states in which the gaze direction of the viewer has moved downward from the 0° direction. At this time, as shown in FIG. 16B, for example, the display position (the screen Pd1) of the image is moved in a vertical direction (a direction perpendicular to the 0° direction). In such a case, for example, the light including the image information travels in a direction intersecting the gaze direction Dg and is incident on the eye 51. In such a case, there are cases where the entire screen Pd1 is not inside the visual field of the viewer 50; and the viewer 50 cannot view the entire image. There are cases where the eye range direction of the image is different and a portion of the screen is undesirably missing.

Conversely, in the embodiment, for example, as shown in FIG. 16C, the display position of the image (the position of the screen Pd1) is adjusted so that the rotation is around the eye 51. In such a case, for example, the light including the image information travels in a direction substantially parallel to the gaze direction and is easily incident on the eye 51. Thereby, for example, the viewer 50 can view the entire image. For example, the driver 33 rotates at least a portion of the image displayer 10 so that the position of the screen Pd1 rotates around the eye 51. The driver 33 modifies the position of at least a portion of the image displayer 10 with respect to the eye 51 based on the gaze direction sensed from the first image.

For example, the position of the central axis of rotation of the image displayer 10 may not be the position of the eye 51. The position of the central axis of rotation of the image displayer 10 may be appropriately selected. For example, the position of the central axis of rotation of the image displayer may be set to be at the central vicinity of the optical unit 15. In such a case, for example, a correction is performed according to the angle between the position of the center of the eye 51 and the position of the center of the optical unit 15.

For example, the display position of the image (the position of the screen Pd1) may be modified by modifying the position of the combiner 12. In other words, the optical unit 15 may modify the position of the combiner 12 with respect to the position of the eye 51 according to the gaze direction of the viewer 50 that is sensed based on the first image. Thereby, the image can be displayed according to the gaze direction of the viewer 50.

For example, the display position of the image (the position of the screen Pd1) may be modified by modifying the optical path of the light including the image information. In other words, the position of the combiner 12 on which a portion of the light including the image information is incident is modified according to the gaze direction of the viewer 50 that is sensed based on the first image. For example, the position or focal length of the ocular lens 13, etc., may be modified. Thereby, the image can be displayed according to the gaze direction of the viewer 50.

For example, the display position of the image (the position of the screen Pd1) may be modified by modifying the image that is displayed by the light emitter 17. For example, the drive circuit 30 modifies the image information based on the first image. Thus, the light that is emitted by the light emitter 17 may be modified based on the first image.

In the embodiment, the methods for modifying the display position described above may be used in appropriate combinations. Thereby, the image can be displayed according to the gaze direction of the viewer 50.

According to the embodiments, an easily-viewable display device is provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the embodiments of the invention are not limited to these specific examples. For example, one skilled in the art may similarly practice the invention by appropriately selecting specific configurations of components such as the light emitter, the optical unit, the image displayer, the imager, the processor, the driver, the holder, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all display devices and all gaze estimating devices practicable by an appropriate design modification by one skilled in the art based on the display devices and the gaze estimating devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A display device, comprising:
   an imager that images a first image including a first state of an eyelid of a viewer; and an image displayer including:
   a light emitter that emits light including image information, and
   an optical unit including a combiner; and
   a holder that holds the image displayer,
wherein:
   the light is incident on the optical unit,
   the combiner causes at least a portion of the light to be incident on an eyeball of the viewer, and
   the image displayer modifies an incident direction of the portion of the light on the eyeball based on a direction of a gaze of the viewer in the first state, the direction of the gaze being based on the first state of the eyelid of the viewer included in the first image, and
   the imager is provided on the holder at a side position of a head of the viewer.

2. The device according to claim 1, further comprising a processor that estimates the direction of the gaze,
   wherein the image displayer modifies the incident direction to be a direction aligned with the direction of the estimated gaze.

3. The device according to claim 1, wherein the image displayer modifies the incident direction based on a comparison between the first image and a second image of a second state of the eyelid of the viewer and a comparison between the first image and a third image of a third state of the eyelid of the viewer, the second image being pre-imaged, the third image being pre-imaged, the third state being different from the second state.

4. The device according to claim 3, wherein a direction of a gaze of the viewer in the second state is different from a direction of a gaze of the viewer in the third state.

5. The device according to claim 3, wherein
   a gaze of the viewer in the third state is oriented downward from the viewer, and
   a gaze of the viewer in the second state is oriented upward from the gaze of the viewer in the third state.

6. The device according to claim 1, wherein the image displayer modifies the incident direction based on at least one of a shape of an upper eyelid of the first image, a distance between the upper eyelid and a lower eyelid of the first image, or a curvature of the upper eyelid of the first image.

7. The device according to claim 1, wherein
   the image displayer further includes a driver that modifies a position of the image displayer with respect to the eyeball based on the first image.

8. The device according to claim 1, wherein the combiner transmits at least a portion of external light traveling toward the eyeball from a side of the combiner opposite to the eyeball.

9. The device according to claim 1, wherein the optical unit modifies a relative position of the combiner with respect to a position of the eyeball based on the first image.

10. The device according to claim 1, wherein the optical unit modifies an optical path of the portion of the light based on the first image.

11. The device according to claim 1, further comprising a drive circuit that controls the light emitter,
   wherein the drive circuit modifies the image information based on the first state of the eyelid of the viewer included in the first image.

12. The device according to claim 1, wherein the holder regulates a spatial arrangement between the image displayer and the eyeball.

13. The device according to claim 12, wherein
   the holder includes a reflector, the reflector being light-reflective, and
   the first image is an image of the eyelid appearing at the reflector.

14. The device according to claim 13, wherein the imager includes an infrared camera.

15. A gaze estimating device, comprising: an imager that images a first image inctuding a first state of an eyelid of a viewer;
   a processor that estimates a direction of a gaze of the viewer in the first state based on the first state of the eyelid of the viewer included in the first image; and
   a holder that holds the image displayer, the imager being provided on the holder at a side position of the head of the viewer,
   wherein the processor estimates the direction of the gaze of the viewer based on a comparison between the first image and a second image of a second state of the eyelid of the viewer and a comparison between the first image and a third image of a third state of the eyelid of the viewer, the second image being pre-imaged, the third image being pre-imaged, the third state being different from the second state.

16. The device according to claim 15, wherein a direction of a gaze of the viewer in the second state is different from a direction of a gaze of the viewer in the third state.

17. The device according to claim 15, wherein a gaze of the viewer in the third state is oriented downward from the viewer, and a gaze of the viewer in the second state is oriented upward from the gaze of the viewer the third state.

18. The device according to claim 15, wherein the processor estimates the direction of the gaze based on at least one of a shape of an upper eyelid of the first image, a distance between the upper eyelid and a lower eyelid of the first image, or a curvature of the upper eyelid of the first image.

19. The device according to claim 15, wherein the holder regulates a spatial arrangement between the imager and an eyeball of the viewer.

* * * * *